United States Patent Office 2,979,514
Patented Apr. 11, 1961

2,979,514

PROCESS FOR PREPARING CARBONATOALKYL ACRYLATES AND METHACRYLATES

Joseph L. O'Brien and Ellington M. Beavers, Elkins Park, Pa., assignors to Rohm & Haas Company, Philadelphia, Pa., a corporation of Delaware No Drawing. Filed July 16, 1957, Ser. No. 672,128

1 Claim. (Cl. 260—340.2)

This invention relates to carbonatoalkyl acrylates and methacrylates, processes for preparing same, and polymer and copolymer products containing one or more of them.

More particularly, the new compounds above referred to have the general formula

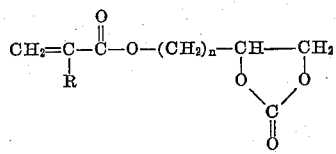

wherein R is a hydrogen atom or a methyl group and $n$ is an integer having a value from one to four, inclusive. Examples of such compounds are as follows:

2,3-carbonatopropyl acrylate
2,3-carbonatopropyl methacrylate
3,4-carbonatobutyl acrylate
3,4-carbonatobutyl methacrylate
4,5-carbonatopentyl acrylate
4,5-carbonatopentyl methacrylate
5,6-carbonatohexyl acrylate
5,6-carbonatohexyl methacrylate They are prepared by reacting the corresponding dihydroxyalkyl acrylates or methacrylates with phosgene or a lower alkyl ester of chloroformic acid, such as ethyl chloroformate in the presence of a hydrogen chloride acceptor such as sodium carbonate, pyridine, triethylamine, or a basic anion exchange resin, as illustrated below:

(a)

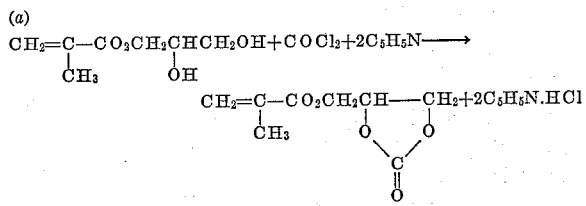

(b)

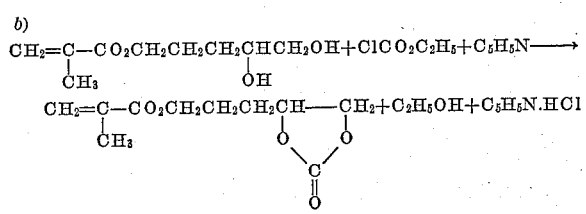

In an alternative procedure, the appropriate carbonato-substituted alcohol is reacted with acrylyl chloride or methacrylyl chloride or a lower alkyl ester of acrylic or methacrylic acid under suitable conditions, as illustrated in the following examples.

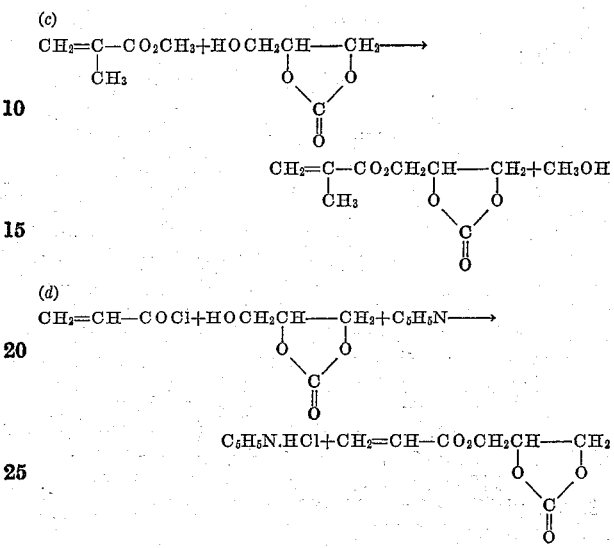

The dihydroxyalkyl acrylates and methacrylates used as starting materials in accordance with this invention, (a) and (b) above, are prepared by the selective hydrolysis of the corresponding isopropylidene derivatives in accordance with the disclosure of an application, entitled "Process for Preparing Dihydroxyalkyl Acrylates and Methacrylates," Serial No. 672,129, filed of even date herewith, and now abandoned.

Carbonato-substituted alcohols suitable for use in the alternative procedure described above, (c) and (d), include the commercially available 2,3-carbonatopropanol-1, which is called "glycerine carbonate" (Jefferson Chemical Co.), and similar carbonato-substituted alcohols.

The following working examples further illustrate specific embodiments of this invention.

A. Preparation of 2,3-carbonatopropyl methacrylate

In a 2-liter 3-necked flask equipped with a stirrer, thermometer, addition funnel and 20" packed column was placed 236 g. (2 moles) of glycerine carbonate, 600 g. (6 moles) of methyl methacrylate, 8.0 g. of hydroquinone and 400 ml. of dry benzene. The fractionating column was fitted with an automatic distillation head and thermoregulator set for a maximum distillation temperature of 65° C. Heat was applied to the stirred reaction mixture and a solution of 0.5 g. of sodium in 10 ml. of methanol was added over a period of 10 hours. During this period, a total of 190 ml. (99% of the theoretical amount) of the benzene-methanol azeotrope (B.P. 58° C.) was collected at the top of the column.

The reaction mixture was allowed to cool to room temperature, filtered and washed with water. The organic layer was dried with anhydrous MgSO$_4$, filtered and stripped under reduced pressure. The residue was distilled in three portions in the presence of the polymerization inhibitor N,N'-di-2-(1,4-napththoquinonyl)- p-phenylenediamine to give a total of 261 g. (70% yield) of 2,3-carbonatopropyl methacrylate, B.P. 112–132° C./ 0.06 mm.

*Analysis.*—Found: Saponification No. 624 (phenolphthalein indicator). Calculated for $C_8H_{10}O_5$ (2 equiv.): Saponification No. 603.

Redistillation of a portion of the above product gave a pure sample of 2,3-carbonatopropyl methacrylate, B.P. 113–127° C./0.10 mm., $n_D^{25}$, 1.4629.

*Analysis.*—Found: C, 52.5%; H, 6.0%; saponification No. 595 (phenolphthalein indicator); saponification No. 298 (methyl red indicator). Calculated for $C_8H_{10}O_5$: C, 51.6%; H, 5.4%; saponification No. (2 equivalents), 603; saponification No. (1 equivalent), 302.

The infrared spectrum of the above compound was found to contain a number of bands characteristic both of the methacrylate ester group and the cyclic carbonate group, thus providing further confirmation of the proposed structure.

B. *Preparation of 2,3-carbonatopropyl methacrylate*

To a solution of 118 g. (1 mole) of glycerine carbonate, 79 g. (1 mole) of pyridine, and 1.0 g. of hydroquinone in 400 ml. of chloroform, there was added 104.5 g. (1 mole) of methacrylyl chloride over a period of one hour with stirring. During the addition and subsequently for two hours, the temperature of the reaction mixture was held at 0–10° C. by vigorous cooling. After it had warmed to room temperature, the reaction mixture was washed successively with ice-cold 5% aqueous sodium hydroxide, dilute aqueous HCl and water. The chloroform solution was dried with anhydrous $MgSO_4$, filtered and stripped under reduced pressure in the presence of 1.0 g. of hydroquinone and 2.0 g. of N,N'-di-2-(1,4-naphthoquinonyl)-p-phenylenediamine. The residue was distilled at reduced pressure. The product which collected at 118–128° C./0.2 mm. amounted to 66.0 g. (35.5% yield) and was identified at 2,3-carbonatopropyl methacrylate, $n_D^{25}$ 1.4640.

C. *Preparation of 2,3-carbonatopropyl methacrylate*

To a solution of 80 g. (0.50 mole) of 2,3-dihydroxypropyl methacrylate, 1.5 g. of hydroquinone and 250 ml. of pyridine, there was added a solution of 49.5 g. (0.50 mole) of phosgene in 75 ml. of dry toluene over a period of one-half hour. During the addition the temperature of the reaction mixture was held at 15–25° C. by vigorous cooling. The mixture was stirred for an additional 4 hours at room temperature. The crystalline precipitate of pyridine hydrochloride was removed by filtration, and the filtrate stripped under reduced pressure. The residue was distilled under reduced pressure in the presence of N,N'-di-2-(1,4-naphthoquinonyl)-p-phenylenediamine. The product which collected at 122–127° C./0.15 mm. amounted to 36.0 g. (39% yield) and was identified as 2,3-carbonatopropyl methacrylate.

D. *Preparation of 4,5-carbonatopentyl methacrylate*

To a solution of 75 g. (0.40 mole) of 4,5-dihydroxypentyl methacrylate and 32 g. (0.405 mole) of pyridine, there was added 43.5 g. (0.40 mole) of ethyl chloroformate over a period of one-half hour. During the addition the temperature of the reaction mixture was held at 35–40° C. by moderate cooling. After stirring for an additional hour at room temperature, the mixture was filtered to remove the crystalline precipitate of pyridine hydrochloride.

The filtrate was charged to a fresh reaction flask and stirred overnight at room temperature with 1.0 g. of dry powdered sodium methoxide. Anhydrous benzene (200 ml.) was then added and the mixture was washed successively with dilute aqueous HCl, ice-cold 5% aqueous sodium hydroxide and brine. The organic layer was dried with anhydrous $MgSO_4$, filtered and stripped under reduced pressure in the presence of 1.0 g. of N,N'-di-2-(1,4-naphthoquinonyl)-p-phenylenediamine. The residue was treated with 0.05 g. of hydroquinone and distilled under reduced pressure. The product which collected at 165–168° C./0.7 mm. amounted to 14.8 g. (17% yield) and was identified as 4,5-carbonatopentyl methacrylate, $n_D^{25}$ 1.4543.

E. *Preparation of 5,6-carbonatohexyl methacrylate*

To a mixture of 20.2 g. (0.10 mole) of 5,6-dihydroxyhexyl methacrylate, 50 ml. of anhydrous toluene and 60 g. of a strongly basic anion exchange resin of the quaternary ammonium hydroxide type, there was added a solution of 9.9 g. (0.10 mole) of phosgene in 25 ml. of dry toluene over a period of one-half hour. During the addition, the temperature was allowed to rise to 45° C. The reaction mixture was stirred and heated at 45° C. for an additional 4 hours. The mixture was then cooled and the anion exchange resin removed by filtration. The filtrate was stripped under reduced pressure in the presence of 0.2 g. of N,N'-di-2-(1,4-naphthoquinonyl)-p-phenylenediamine. The residue was distilled under reduced pressure. The product which collected at 184–188° C./ 2.4 mm. amounted to 11.5 g. (50% yield) and was identified as 5,6-carbonatohexyl methacrylate.

F. *Preparation of 2,3-carbonatopropyl acrylate*

To a solution of 118 g. (1 mole) of glycerine carbonate, 79 g. (1 mole) of pyridine and 1.0 g. of hydroquinone in 350 ml. of benzene, there was added 90.5 g. (1 mole) of acrylyl chloride over a period of one hour with stirring. During the addition, the temperature of the reaction mixture was held at 5–10° C. by vigorous cooling. The mixture was allowed to warm to room temperature and was stirred for an additional hour.

The crystalline precipitate of pyridine hydrochloride was removed by filtration and the filtrate washed successively with dilute aqueous HCl, ice-cold 5% aqueous sodium hydroxide and water. The benzene solution was dried with anhydrous $MgSO_4$, filtered and stripped under reduced pressure in the presence of 0.5 g. of hydroquinone. The residue was a clear, yellow oil which amounted to 138 g. (80% yield) and was identified as 2,3-carbonatropropyl acrylate.

G. *Polymerization of 2,3-carbonatropropyl methacrylate in sheet form*

A mixture of 120 g. of 2,3-carbonatopropyl methacrylate, 0.03 g. of benzoyl peroxide catalyst and 0.06 g. each of a common peak suppressant and mold release agent was heated briefly with moderate stirring and poured into a small plate glass mold. The mold was placed in a hot air oven and held at 60° C. until stiffening of the mix was observed. A conventional polymerization cycle (60–110° C.) was then begun. On completion of the cycle, the casting separated easily from the mold, with no evidence of let-go or adhesion. The sheet was clear and colorless, with excellent surface quality. Specimen bars were cut from this plastic sheet and heat-treated at 180° C. for 1½ hours, followed by a slow cooling or annealing. The resultant material showed no evidence of thermal decomposition and had a heat distortion temperature of 130° C. It was highly resistant to the common organic solvents, including such solvents as chloroform, dimethyl formamide and propylene carbonate.

H. *Copolymerization of 2,3-carbonatopropyl methacrylate with methyl methacrylate*

A mixture of 20 g. of 2,3-carbonatopropyl methacrylate, 80 g. of methyl methacrylate, 0.02 g. of benzoyl peroxide catalyst and 0.06 g. each of a common peak suppressant and mold release agent was polymerized in sheet form in the manner described in Example G. The resultant material was clear and colorless and had a heat distortion temperature of 107° C. It was moderately resistant to the common organic solvents.

I. *Copolymerization of 2,3-carbonatopropyl methacrylate with an unsaturated polyester resin*

A clear blend of 60 g. of a polyester derived from maleic anhydride and dipropylene glycol and 40 g. of 2,3-carbonatopropyl methacrylate was obtained by stirring the components at 80° C. in a glass vial. To the resultant solution was added 1.5 g. of tert.-butyl perbenzoate and the mixture heated for one hour each at 80° C., 90° C., 100° C., and 120° C. After cooling slowly to room temperature, the contents of the vial were removed and found to consist of a slightly hazy plastic having a Barcol hardness value of 50. The polyester resin composition had excellent solvent resistance, showing no evidence of attack by toluene, acetone or dimethylformamide.

We claim:

A process for preparing a compound of the formula

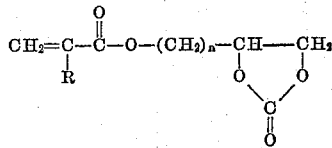

wherein R is a member of the class consisting of a hydrogen atom and a methyl group and $n$ is an integer having a value of one to four, inclusive, which comprises reacting, while removing heat generated by the reaction and in the presence of a basic hydrogen chloride acceptor, a compound of the formula

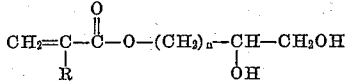

wherein R and $n$ are as above indicated, with a compound from the group consisting of phosgene and an alkyl ester of chloroformic acid wherein the alkyl group contains one to four carbon atoms.

References Cited in the file of this patent

UNITED STATES PATENTS

| | | |
|---|---|---|
| 2,384,124 | Muskat et al. | Sept. 4, 1945 |
| 2,511,942 | Prichard | June 20, 1950 |
| 2,522,680 | Kropa et al. | Sept. 19, 1950 |
| 2,524,432 | Dorough | Oct. 3, 1950 |

FOREIGN PATENTS

| | | |
|---|---|---|
| 742,793 | Great Britain | Jan. 4, 1956 |

OTHER REFERENCES

Bruson et al.: "Journal Am. Chem. Soc.," vol. 74, 1952, pp. 2100–2101. (Copy in Sci. Lib.)